E. F. W. ALEXANDERSON.
MOTOR EXCITATION.
APPLICATION FILED DEC. 18, 1913.
1,289,592.
Patented Dec. 31, 1918.
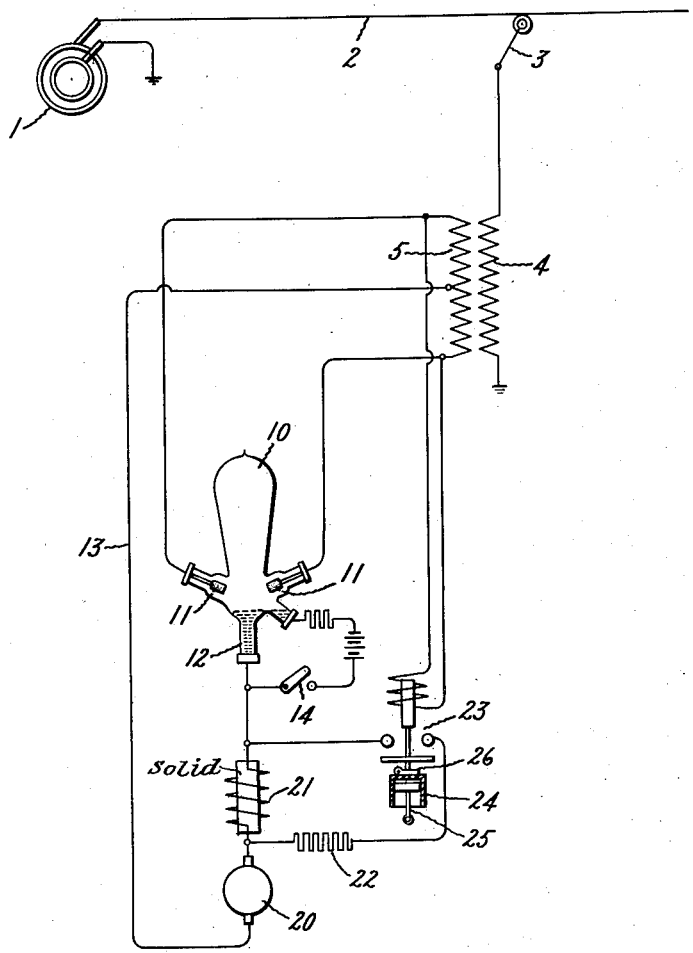
Witnesses
Anthony Mart
J. Ellis Glen.
Inventor
Ernst F. W. Alexanderson
by
His Attorney.

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

MOTOR EXCITATION.

1,289,592.  Specification of Letters Patent.  Patented Dec. 31, 1918.

Application filed December 18, 1913. Serial No. 807,553.

*To all whom it may concern:*

Be it known that I, ERNST F. W. ALEXANDERSON, a citizen of the United States, residing at Schenectady, county of Schenectady, State of New York, have invented certain new and useful Improvements in Motor Excitations, of which the following is a specification.

My invention relates to electric locomotives, and more especially to those in which series motors are supplied with power from a suitable rectifier system.

The use of a motor generator set or a rotary converter, as a rectifier on a locomotive, is not desirable because of the great weight and cost of such machinery, but the mercury arc rectifier constitutes a light and comparatively inexpensive rectifying device. With such a rectifying device, however, certain difficulties are encountered. The inherent cause of these difficulties lies in the fact that the output from the direct current side of a mercury arc rectifier is a pulsating current and not a steady current. Such a pulsating current may be considered as made up of two components, one an alternating current and the other a direct current of constant value. The introduction of the alternating current component in the motor field is objectionable. If the core of the field of the motor is solid, as is usual in direct current motors, it will be excessively heated by the rapid changes of flux and the consequent hysteresis and eddy current losses. If the core be laminated, as is usual in alternating current motors, it will produce a pulsating flux in the field, which by linkage with those coils of the armature which are short circuited by the brushes will give rise to the so-called "transformer action" in these coils and make commutation difficult.

The object of my invention is to produce an arrangement which will enable the use of a series motor with a pulsating current supply and at the same time prevent heating of the field core and transformer action in the armature. I do this by connecting a resistance, in shunt with the motor field, of such construction that its time constant shall be much smaller than that of the motor field. Preferably this shunt will be non-inductive and have an ohmic resistance larger than that of the motor field.

Another object of my invention is to protect the motor against current rushes when the voltage is momentarily interrupted. I accomplish this by means of a quick opening, slow closing relay switch energized from the source of supply to close the shunt circuit.

In the drawing I have illustrated diagrammatically the apparatus and connections used in my invention. An alternating current generator 1 furnishes current to the trolley line 2 from which it is taken by the trolley 3. In the locomotive the trolley is connected to the primary 4 of the transformer and the other side of this primary is connected to ground. The secondary 5 of the transformer is provided with the usual terminals and with an intermediate tap. In order that the motors of my locomotive may be supplied with a direct current, I provide a mercury arc rectifier 10, whose anodes 11 are connected to the terminals of the secondary winding 5. Cathode 12 of the rectifier is connected directly to one terminal of the motor, while the other terminal of the motor is connected by the circuit 13 to the central tap of the secondary 5. I have indicated at 14 the customary starting circuit for the rectifier. Although the rectifier which I have here shown is of the type using a glass container, it is to be understood that the showing is only diagrammatic and that any type of mercury arc rectifier may be used.

It will be understood that the motor 20 which is shown is a diagrammatic representation of the motor equipment which in general comprises several motors which would be properly interconnected and controlled by the usual controller. This motor is of the series type such as is common in railroad work. Around the series field winding 21 I provide a shunt circuit containing a preferably non-inductive resistance 22. This circuit is closed by means of a relay switch 23 whose solenoid is connected across the terminals of the secondary 5. The switch is provided with a dashpot 24 having a fixed plunger 25 and a valve 26, the construction being such that the switch will be opened quickly by gravity, but close slowly when the solenoid is energized. This special construction of switch is, however, not essential, and any form can be used which will operate in a similar manner.

As will be understood by those skilled in the art, the current output of a mercury arc rectifier is a pulsating current, and if such a current is supplied directly to the motor it will produce pulsations of flux in the field. Such pulsations are objectionable, first, because of the heating caused thereby in the solid iron structure of the field core of an ordinary direct current motor; and, second, because of the sparking at the commutator produced by the voltage induced thereby in those coils short circuited by the brushes. Evidently, the field winding 21, when supplied with a solid core, will have a high inductance, and for this reason will not be readily traversed by alternating currents. Making use of this characteristic, I have provided a shunt circuit around the field consisting of a preferably non-inductive resistance, though any resistance having a lower time constant than the field winding may be used. In operation the pulsating current from the rectifier will divide itself into two components, an alternating current component and a direct current component. The alternating current will pass through the shunt circuit of relatively low inductance, and the direct current component will divide in proportion to the relative resistances but the greater portion of it will pass through and energize the field winding. This, therefore, attains the desired result by providing a separate path for the alternating current component, and because of the smaller time constant of this path, no pulsating current will pass through the main field, thereby preventing pulsations of flux in the field.

Certain dangers are introduced by the use of such a shunt circuit, and to avoid these I have provided the relay switch previously described. When the trolley is operating on a trolley wire partially covered with sleet, it is known as an "arcing trolley," because an arc is formed when it is momentarily separated from the trolley wire by the sleet. When the current is interrupted by this or similar causes and again supplied to the motors, a rush of current is produced which would traverse the non-inductive resistance of the shunt and the low resistance armature and thereby cause undesirable results. If, however, the shunt circuit is opened whenever the voltage fails and is not closed until a few seconds after current is again supplied, the high inductance of the field will prevent any such rush of current, and, therefore, avoid the danger noted. As will be readily evident, such a result is obtained by the use of the particular construction of dashpot described, as the valve 26 will allow the switch to be opened quickly by gravity, but will force it to close slowly when the coil of the relay is energized.

By means of these constructions and connections, I am able to overcome the difficulties mentioned and to provide a practical working construction of mercury rectifier locomotive by means of which pulsations of flux in the field are prevented and the satisfactory operation of the motor from a pulsating current assured. My construction provides a separate path of relatively low inductance for the alternating current component of the pulsating current, thus supplying only a steady, direct current to the field of the motor. A certain danger being introduced by this construction, I have provided a safeguard in the form of a relay switch, which opens the shunt circuit whenever the supply voltage is interrupted. As explained above, this leaves the high inductance of the field winding in the circuit and effectually cuts down the rush of current when the voltage comes on.

I have herein shown the best embodiment of my invention now known to me, but certain modifications or alternative constructions within the scope of my invention might be used to accomplish the same result. I do not wish, therefore, to be limited to the exact arrangement shown, but aim to cover in the appended claims all modifications within the scope and spirit of my invention.

What I claim as new and desire to secure by Letters Patent of the United States, is:—

1. The combination of a series motor having a field winding, a source of pulsating current, and means comprising a by-pass around said field winding for currents flowing in either direction for preventing pulsations of current in the field winding of said motor.

2. The combination of a series motor having a field winding, a supply of pulsating current therefor, and means comprising a by-pass around said field winding for currents flowing in either direction to prevent pulsations of flux corresponding to the pulsations of said supply current in the field of said motor.

3. The combination of a series motor having a field winding, a source of pulsating current, and a shunt circuit around the field winding of said motor having a smaller time constant than said field winding.

4. The combination of a series motor having a field winding, a source of pulsating current, and a shunt circuit around the field winding of said motor having a smaller time constant than said field winding and a larger ohmic resistance.

5. The combination of a series motor having a field winding, a source of pulsating current and a non-inductive resistance connected in shunt around the motor field winding.

6. The combination of a series motor having a field winding, a source of pulsating current, and a shunt circuit of relatively low inductance around the motor field winding.

7. The combination of a series motor provided with a field winding and a solid field structure, a source of pulsating current, and means for preventing pulsations of flux corresponding to the pulsations of said supply current in the field of said motor.

8. The combination of a series motor having a field winding, a source of pulsating current, a non-inductive resistance connected in shunt around the motor field winding, and means in said shunt circuit to slowly close said circuit when current is supplied to the motor.

9. The combination of a series motor having a field winding, a source of pulsating current, a non-inductive resistance connected in shunt around the motor field winding, and means in said shunt circuit adapted to quickly open the same upon the failure of the current supply and then to slowly close said circuit when current is supplied to the motor.

In witness whereof, I have hereunto set my hand this 17th day of December, 1913.

ERNST F. W. ALEXANDERSON.

Witnesses:
 HELEN ORFORD,
 MARGARET E. WOOLLEY.